United States Patent Office 3,396,910
Patented Aug. 13, 1968

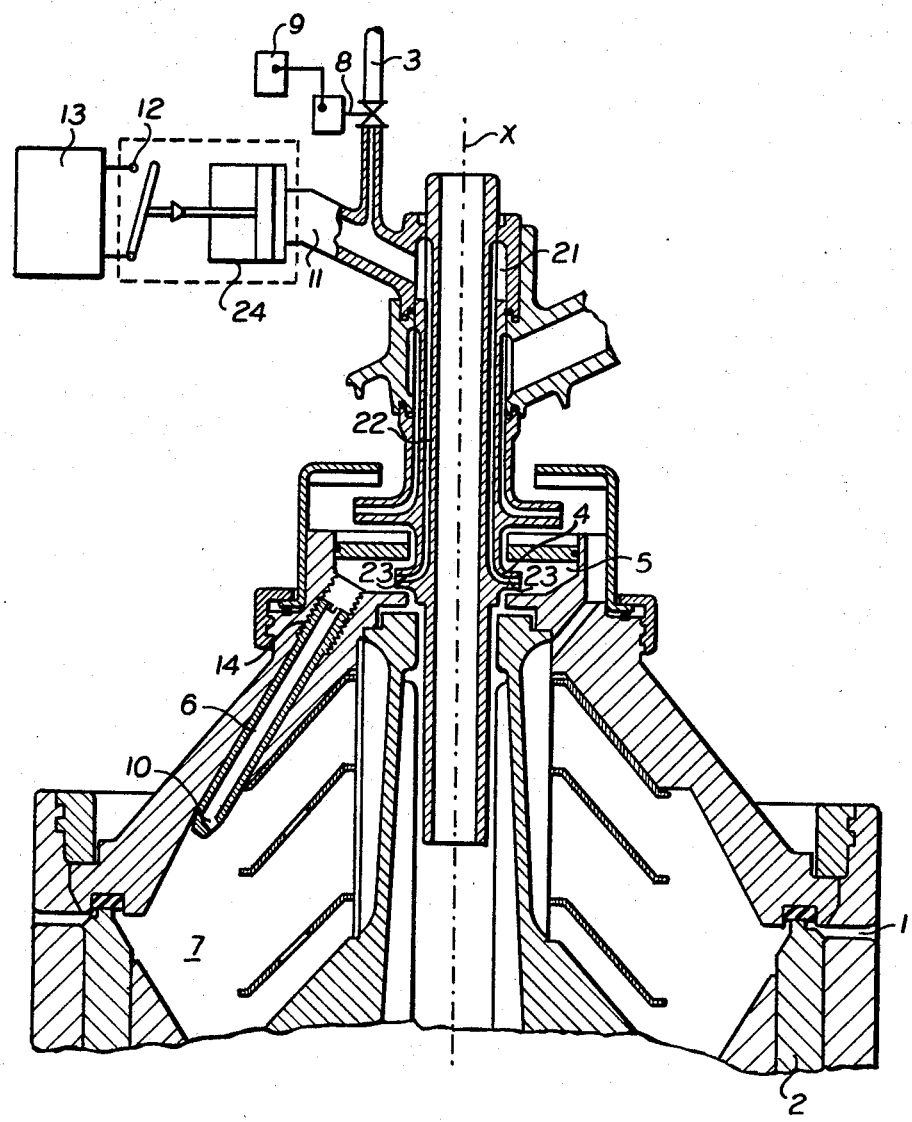

3,396,910
METHOD AND APPARATUS FOR SENSING THE FULLNESS OF THE MUD CHAMBER IN A CENTRIFUGAL SEPARATOR
Peter Steinacker, Oelde, Germany, assignor to Westfalia Separator Aktiengesellschaft, Oelde, Westphalia, Germany
Filed Aug. 16, 1966, Ser. No. 572,752
Claims priority, application Germany, Aug. 17, 1965, W 39,743
11 Claims. (Cl. 233—20)

ABSTRACT OF THE DISCLOSURE

Method and apparatus for determining the fill level of the mud chamber in a centrifuge by weighing the input-flow rate to the chamber and determining the back pressure corresponding thereto.

---

This invention relates in general to a method and apparatus for sensing the fill level of the mud chamber in a centrifugal separator wherein suspended solid materials are separated from a liquid stream introduced into the separator and the solids are collected in the mud chamber thereof.

Essentially, the method of the invention resides in the intermittent introduction of a sensing liquid into the mud chamber through a passage having a discharge outlet located at a position within the mud chamber corresponding to a predetermined solid material fill level condition which is to be detected. Such fill level condition is detected by sensing the back pressure of the liquid in the passage and generating a signal in response to an increase of such back pressure which is characteristic of passage outlet obstruction by solid materials compacted thereat. Thus, whenever solid materials collect within the mud chamber up to a fill level which obstructs the sensing liquid outlet passage, a signal is generated to indicate the occurrence of such event. This signal can be utilized for practically any desired purpose, such as for example, to stop the flow of a liquid stream carrying suspended solid materials into the separator, or to initiate self-cleaning action in separators having self-cleaning drum capabilities.

In German Patent No. 1,173,030, there is described a method for the automatic generation of a signal, such as a control pulse, whenever the mud chamber of a centrifugal separating drum has become filled to a certain level with components of heavier specific gravity. This prior art method and apparatus is characterized in that, from a chamber located in the vicinity of the drum axis, a liquid is continuously introduced through passages into the mud chamber, and the displacement of the free liquid level in this chamber, brought about by the filling up of the mud chamber with separated high specific gravity components, is utilized to establish the signal or control pulse.

The instant invention provides an improvement over this prior art method and apparatus for sensing the fullness of the mud chamber in a centrifugal separator.

According to the invention, it has been found that, with many types of separable solids, the continuous feeding of a sensing liquid into the mud chamber delays the build-up of a dam to block the orifices of the sensing liquid feed passages, and sometimes, such continuous feeding of liquid through these passages even makes it impossible to form an obstructing dam in front of the outlets of these passages to enable the detection of a solid material fill level thereat. Thus, where the sensing liquid is continuously fed into the mud chamber, the separated solid materials can collect within the mud chamber up to a level which is often far beyond that of the sensing liquid passage outlets before such outlets become plugged with compacted solids. The delay between attaining a solid material fill level extending up to the sensing liquid passage outlet, and the generation of a signal indicative of such condition will depend in general upon the nature of the solids collected in the mud chamber and their tendency to compact at the passage outlet. In the case of the prior art method and apparatus, these delays are inherently larger than any of those encountered with the method and apparatus of the invention, because with a liquid constantly emerging from the passage outlet, the separated solids were kept in a loosened or turbulent state to the extent that these solids could not mat together or coalesce into a solid cake plugging the passage outlet.

It has now been found that the delays between the reaching of a certain collected solids fill level and the emission of the signal or controlling pulse indicative of such condition are greatly reduced if the feeding of the sensing liquid takes place intermittently. According to the theory of the invention, as soon as the solids have covered up the outlet orifices of the feeding passages, they coalesce during the first interruption of the sensing liquid feed, and under the influence of the centrifugal force created by operation of the separator, these coagulated solids form a plug, so that when the sensing liquid feed is resumed, there is at least a partial if not a total obstruction of the sensing liquid passage outlet to the extent that a characteristic increase in the sensing liquid back pressure can be noted. By means of an appropriate pressure transducer, this increase in back pressure can be made to generate a signal which represents the occurrence of a solid materials fill level which extends up to the sensing liquid passage outlet.

The method of the invention is accordingly characterized by the fact that the feeding of sensing liquid from a centrally located chamber into the mud chamber of a centrifugal separator takes place with interruptions in flow. In the case of certain types of solid materials separated from a liquid stream, it is not absolutely necessary that the flow of sensing liquid during these periods of interruption be completely cut off, but in accordance with the invention a sufficiently great reduction in sensing liquid flow rate will suffice for achievement of the same signal generating effect. Thus, as used herein, the term intermittent with respect to the introduction of the sensing liquid into the mud chamber is intended to designate a periodically varying liquid flow rate between a finite full flow rate and a restricted flow rate which can be either zero or a finite flow rate small in comparison to the full flow rate, the only essential condition being that under restricted flow conditions solid materials collected in the mud chamber up to the level of the sensing liquid passage outlet can coagulate thereat to the extent that a detectable increase in sensing liquid back pressure results.

The apparatus of the invention is distinguished from that used in performing the prior art method by reason of its inclusion of a flow control means, such as for example a shut off valve which is adjustable to provide different rates of sensing liquid flow, and which is installed in the sensing liquid supply line. This flow control means is operated by a timer means such that flow of sensing liquid into the mud chamber is opened and closed periodically at definite, but preselectable, time intervals. In this manner, both the velocity of sensing liquid flow and the time duration for which such flow is interrupted can be so adjusted that the liquid feed passages are always plugged by the solid materials separated by centrifugal force when such solids have reached a level within the mud chamber corresponding to the location of the liquid feed passage outlets.

To provide a greater flexibility of operation, the invention provides an apparatus wherein the sensing liquid feed passages are defined as interchangeable, displaceable or adjustable tubes which can be set in any one of a variety of outlet locations to sense various corresponding solid fill levels within the mud chamber of a centrifugal separator drum. These tubes are preferably adjusted before beginning each centrifuge run.

It is therefore, an object of the invention to provide a method for sensing the fill level of separated solid materials collected within the mud chamber of a centrifugal separator.

Another object of the invention is to provide an apparatus for sensing the solid material fill level within a centrifugal separator mud chamber in accordance with the aforesaid method.

A further object of the invention is to provide a method and apparatus as aforesaid whereby upon attainment of a predetermined solid material fill level, a signal indicative of such fill level condition is generated.

A further object of the invention is to provide a method and apparatus as aforesaid whereby any delay between the achievement of such designated fill level condition and the generation of a signal indicative thereof is minimized.

Still another and further object of the invention is to provide an apparatus as aforesaid which is adjustable to permit the detection of any selected solid fill level condition within a continuous range.

Other and further objects and advantages of the invention will become apparent from the following detailed description and accompanying drawing which illustrates schematically an apparatus according to a preferred embodiment of the invention for sensing the fill level of a centrifugal separator mud chamber as shown in a longitudinal sectional view.

The drawing shows a centrifugal separator of the type having a self-cleaning drum provided with orifices 1 for the periodic ejection of collected solids. These orifices 1 are normally closed by a sliding piston valve 2 during centrifuge operation.

A sensing liquid is brought in from a supply means (not shown) through a pipe line 3, and passes through a magnetically operable flow control valve 8 into a branch pipe line 11, and thence into a distribution chamber 21 located around the upper portion of a shaft 22 bearing a stationary skimmer disk 4. The magnetic valve 8 in line 3 is periodically opened by a timer switch 9. From the distribution chamber 21, the sensing liquid passes downward through open passages 23 which lead radially outward to the periphery of the skimmer disk 4. The liquid emerges from passages 23 of skimmer disk 4 into a chamber 5 which rotates with the centrifuge drum and its mud chamber 7. From the rotating chamber 5, the liquid passes into the mud chamber 7 through passages defined by one or more typical tubes 6.

As long as the solids separated by centrifuging and collected in the mud chamber 7 do not cover the discharge orifices 10 of tubes 6, the sensing liquid can freely emerge therefrom. Not until the orifices 10 of tubes 6 are immersed in the solid layer and a sealing plug has built up during the pauses in the feed of liquid through tubes 6 does the sensing liquid fill the chamber 5. Under such conditions, the skimmer disk 4 is immersed in the rotating fluid within chamber 5 thereby producing in the branch line 11 a rise in the fluid back pressure thereat which brings about the closing of a switch contact 12 operated by a pressure transducer 24. The closing of switch contact 12 can be utilized to actuate the operation of a controlling device 13, such as can be used to shut off the incoming stream of liquid carrying suspended solids in order to prevent overfilling the mud chamber 7 with separated solids, or can be used to shift the piston slide valve 2 into a position which uncovers the orifices 1 for the ejection therethrough of collected solids, or in fact for any other desired purpose wherein the filling of the mud chamber 7 with solids up to the level of orifices 10 is of significance.

According to a preferred embodiment of the invention, the tubes 6 are so constructed and arranged that the spacing of the orifices 10 from the drum rotation axis X can be selectively varied. For example, where the tubes 6 are installed in the drum by means of screw threads 14, the radial and/or axial position of the orifices 10 with respect to the axis X can be adjusted as desired simply by screwing the tubes 6 further inward or outward with respect to the drum.

To assume the formation of a sealing plug, or at least a flow restricting compaction of solid materials obstructing the outlet orifice 10 of each tube 6 when solids collected within the mud chamber 7 reach the level of the orifice 10, the flow of sensing liquid through tube 6 is periodically interrupted by closing valve 8. Depending upon the coagulation characteristics of the solids collected, this periodic interruption of sensing liquid flow can be either complete or partial. Valve 8 is expediently an electromagnetically operable valve which is controlled by an electrically driven timer switching device 9, preferably of a type which can be adjusted to provide various selectable sensing liquid flow cycles, wherein the degree of valve 8 closure and the duration thereof can be preset to assume that whenever the collected solids fill the mud chamber 7 to the extent that orifice 10 is first below the solid phase free surface, a liquid back pressure will occur in line 11 sufficient to operate the switch 12 of pressure transducer 24, thereby generating a signal indicative of such solid fill level condition.

By periodically interrupting the flow of sensing liquid through the orifice 10, solids collecting at the level thereof have an opportunity to coagulate during times when the flow is interrupted.

Preferably, as a general rule, the interruption of the flow of sensing liquid is a complete interruption, i.e., zero flow rate, as this will favor the compaction of solids obstructing the orifice 10. The duration of interruption is preferably selected in relation to the rate at which solids are separated, taking into account the shape of the mud chamber 7 insofar as it concerns the shifting of the collected solids interface with quantity of solids collected. For example, the duration of sensing liquid flow interruption must not be so large as to permit an excessive accumulation of solids beyond the level of the orifice 10 before opening of valve 8 allows detection of the characteristic overpressure of line 11. If such were allowed to occur, the signal generated by closure of the pressure operated switch 12 would be delayed to the extent that an undesirable overshoot in fill level would exist at the time such signal was generated.

As can be appreciated by the artisan from the foregoing, the invention is susceptible of numerous obvious modifications ad variations to suit the needs of a particular application. However, the invention is intended to be limited only by the following claims in which I have endeavored to claim all inherent novelty.

What is claimed is:

1. A method for sensing the fill level of the mud chamber in a centrifugal separator wherein suspended solid materials are separated from a liquid stream introduced into the separator and collected in the mud chamber thereof, which comprises intermittently varying the flow rate of a liquid introduced into the mud chamber through a passage having a discharge outlet disposed at a position therein corresponding to a predetermined solid material fill level condition to detect the occurrence of such fill level condition by the change in back pressure of the liquid in said passage resulting from the obstruction of the outlet thereof by solid materials compacted thereat, and sensing the back pressure of the liquid in said passage to detect the obstruction thereof, and hence the occurrence of such fill level condition by a characteristic rise in such liquid back pressure.

2. The method according to claim 1 including the step of generating a signal in response to said characteristic liquid back pressure rise to indicate the occurrence of said fill level condition.

3. The method according to claim 2 wherein the flow rate of the liquid introduced into the mud chamber is periodically reduced to zero.

4. An apparatus for sensing the fill level of the mud chamber in a centrifugal separator wherein suspended solid materials are separated from a liquid stream introduced into the separator and collected in the mud chamber thereof, which comprises means defining a liquid flow passage extending into the mud chamber of the separator and having a discharge outlet disposed at a position therein corresponding to a predetermined solid material fill level condition, said passage means being disposed for communication with a liquid supply means to receive liquid therefrom for introduction into the mud chamber through said outlet, liquid flow control means interposed in the flow path between said supply means and said passage means to periodically vary the flow rate of liquid delivered thereto between a finite flow rate and a restricted flow rate to accommodate the compaction of solid materials obstructing said passage outlet when the fill level of solid materials collected within the mud chamber reaches said predetermined fill level condition, and pressure sensing means disposed for sensing the pressure of liquid in communication with said passage, said pressure sensing means being responsive to a predetermined liquid back pressure condition characteristic of the obstruction of said passage outlet by solid materials compacted thereat up occurrence of said solid material fill level condition to generate a signal indicative thereof.

5. The apparatus according to claim 4 wherein said passage defining means includes a tube disposed for flow communication with the liquid supply means and for movement in unison with the rotary movement of the mud chamber, said tube having an outlet orifice disposed at a position with respect to the mud chamber axis of rotation corresponding to said predetermined solid material fill level condition.

6. The apparatus according to claim 5 wherein said liquid flow control means includes an electromagnetically operable valve interposed in the flow path between the liquid supply means and said passage means, and a timer means operatively connected to said electromagnetic valve to periodically vary the flow of liquid therethrough between said finite and restricted flow rates.

7. The apparatus according to claim 6 wherein said pressure sensing means includes a pressure transducer disposed to sense the pressure of liquid in communication with said tube, said pressure transducer being responsive to a predetermined liquid back pressure characteristic of the obstruction of said tube outlet orifice by compacted solid materials, and thereby indicative of said fill level condition, to establish a signal signifying the occurrence of said fill level condition as determined by the sensing of such characteristic back pressure.

8. The apparatus according to claim 7 wherein said tube is adjustably supported within mud chamber for limited displacement relative thereto to selectively vary the position of the tube outlet orifice with respect to the mud chamber rotation axis to correspondingly vary the solid material fill level condition at which said signal is established.

9. The apparatus according to claim 8 wherein said tube is disposed for communication with a stationary liquid supply means.

10. The apparatus according to claim 9 wherein said tube is adjustably supported for limited radial displacement with respect to the mud chamber rotation axis, said tube being disposed for adjustment from the outside of said mud chamber.

11. The apparatus according to claim 9 wherein said tube is adjustably supported for limited pivotal displacement with respect to the mud chamber rotation axis.

References Cited

UNITED STATES PATENTS

| | | | |
|---|---|---|---|
| 2,378,778 | 6/1945 | Lindgren et al. | 233—20 |
| 3,085,742 | 4/1963 | Palmqvist | 233—19 XR |
| 3,160,589 | 12/1964 | Stone | 233—20 |
| 3,167,509 | 1/1965 | Steinacker | 233—20 |
| 3,261,546 | 7/1966 | Gruver | 233—20 |
| 3,301,476 | 1/1967 | Hemfort | 233—20 |
| 3,360,194 | 12/1967 | Wilsmann | 233—19 |

HENRY T. KLINKSIEK, *Primary Examiner.*